May 23, 1967 L. M. CHRISTIANSON 3,321,066
TEXTILE MILL CONVEYOR BELTS
Filed Dec. 16, 1965

Inventor:
Lynn M. Christianson
By:
Darby, Robertson &
Vandenburgh Attys.

United States Patent Office

3,321,066
Patented May 23, 1967

3,321,066
TEXTILE MILL CONVEYOR BELTS
Lynn M. Christianson, 7 Elaine Circle E.,
Prospect Heights, Ill. 60070
Filed Dec. 16, 1965, Ser. No. 514,301
8 Claims. (Cl. 198—178)

ABSTRACT OF THE DISCLOSURE

A textile mill conveyor is provided which has one or more belts, preferably a plurality, covered by a flexible sheet of fireproof material forming a conveying surface, and with a plurality of spaced transverse slats fastened to the belts in a manner such as to maintain continuous contact between the transverse edge of the slats and the sheet of fireproof material. In the preferred embodiment this means comprises a rigid metal member between the belts and the sheet of fireproof material, which member holds the sheet of fireproof material securely against the bottom of the slat. In this embodiment the slat is recessed so that the sheet of fireproof material and the rigid member are received within the recess in the bottom of the slat.

---

This invention relates generally to textile mill conveyor belts, and more particularly to conveyor belt assemblies including transverse slats carried thereon for conveying fibers prior to their being spun into thread or the like.

Conveyors of this type are usually constructed of several distinct parts including a flexible endless belt and a plurality of longitudinally spaced and transversely oriented wooden slats connected thereto. Generally the slats consist of a solid piece of wood connected to the belt by means of a single row of fasteners such as screws, rivets, or the like. Various forms of slats are commonly used including one having spikes jutting outwardly therefrom for picking up fibers from a randomly oriented mass thereof and aligning them longitudinally over the conveyor belt assembly.

One problem experienced with the use of wooden slats is due to wear and changing environmental conditions which cause the slats to fray or splinter slightly, but enough to expose slivers. The fibers transported on the conveyor occasionally catch on these slivers and are thereby restrained from dropping off at their proper destination. Furthermore, wooden slats are not fireproof, and this property is a definite disadvantage in a textile mill.

Because the belt is flexible and the slats are comparatively rigid, there is always a small amount of play present between these parts during operation, and this play enables fibers to be trapped therebetween. When the textile mill operators decide to use the conveyor for conveying fibers of another color, it is necessary to remove these trapped fibers to ensure that they will not become loose and intermingle with the next and differently colored batch of fibers. This, of course, is a difficult and time-consuming task.

It is therefore a general object to provide a new and improved fiber conveyor having both a flexible conveyor belt and rigid slats connected thereto and so arranged as to not permit fibers to become trapped therebetween.

It is a collateral object of this invention to provide a new and improved conveyor belt assembly having slats which can neither fray nor burn.

Other objects and advantages of the invention will become apparent from the following description when taken in conjunction with the following drawings, wherein.

Although the following disclosure offered for public dissemination is detailed to ensure adequacy and aid understanding, this is not intended to prejudice that purpose of the patent which is to cover each new inventive concept therein no matter how others may later disguise it by variations in form or additions or further improvements. The claims at the end hereof are intended as the chief aid toward this purpose; and it is these that meet the requirement of pointing out the parts, improvements, or combinations in which the inventive concepts are found.

Figure 1:
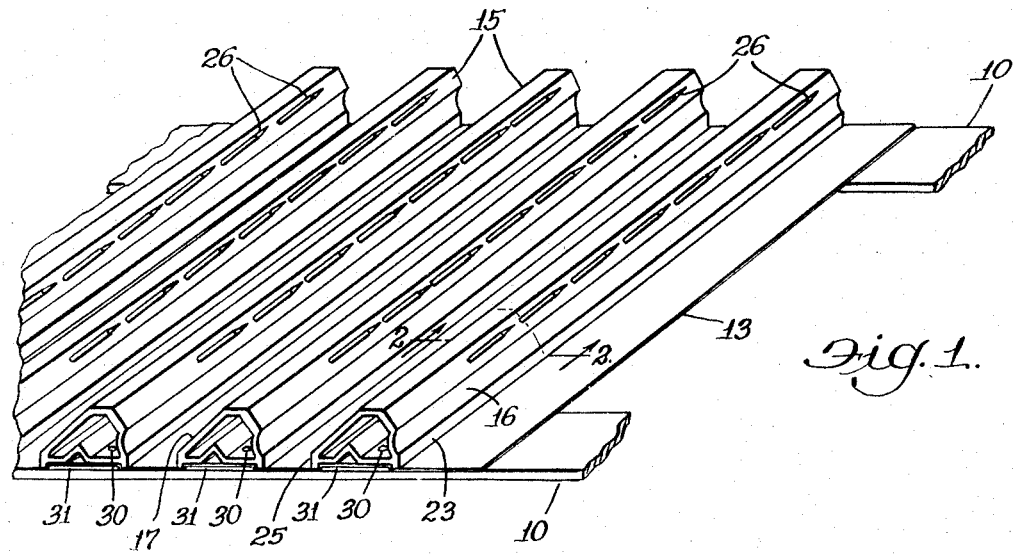
FIGURE 1 is a perspective view of a portion of a conveyor belt and slat assembly incorporating the principles of this invention.
Figure 2:
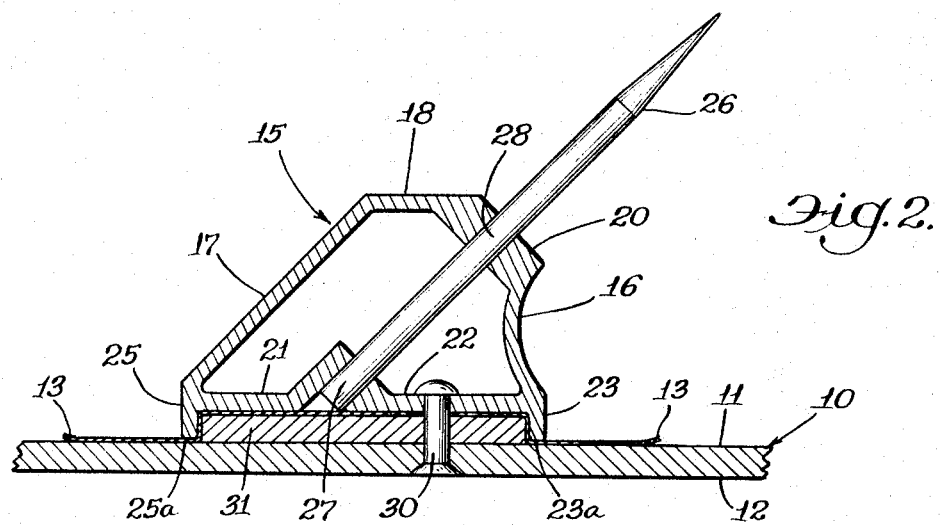
FIGURE 2 is an enlarged fragmentary and cross-sectional view of the portion of the assembly shown in FIGURE 1, taken generally along the line 2—2 of FIGURE 1.
Figure 3:
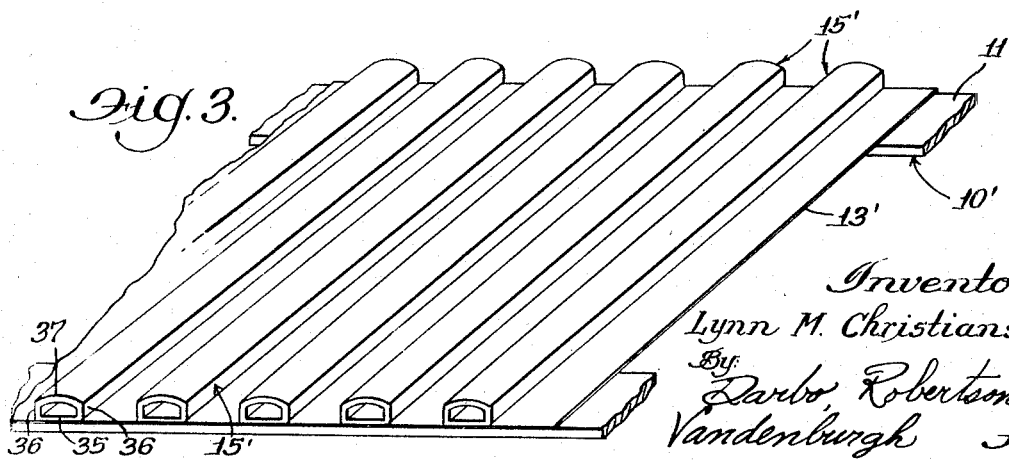
FIGURE 3 is a perspective view of a portion of a conveyor belt having a different type of slat attached thereto, also representative of this invention.

Referring now to the drawings in more detail, FIGURES 1 and 2 show one form of slat and FIGURE 3 shows a different form, like parts having like numbers primed. The conveyor belt assembly of FIGURES 1 and 2 includes a pair of elongate and spaced-apart endless belts 10 of conventional shape, including upper or outer surfaces 11 and lower or inner surfaces 12 which are driven in a conventional manner by means not shown. Covering surfaces 11 and extending between endless belts 10 is a sheet 13 of resilient and fireproof material, such as "Fluorglas." Preferably, the belting 10 also is formed of a fireproof or fire-resistant material.

Mounted transversely of belt 10 and over sheet 13 is a plurality of parallel and spaced-apart slat members 15, extruded from a metal such as aluminum. Each of the slats 15 is hollow to conserve material and reduce weight. Each slat has an upright front or leading concave wall 16, a rear or trailing wall 17 sloping rearwardly and downwardly, a side wall 18 connected to rear wall 17, a forwardly and inwardly sloping spike supporting wall 20 joining upper wall 18 with front wall 16, and a generally inverted channel-shaped inner wall 21 connecting front wall 16 with rear wall 17 at their lower portions. Inner wall 21 includes a flat portion 22 and front and rear leg portions 23 and 25 respectively. Each of leg portions 23 and 25 is relatively thin and has a radius at its distal end, as at 23a and 25a. Ends 23a and 25a seat firmly against sheet 13 while avoiding injury to the portions of the sheet 13 with which it is in contact. Slats 15 each carry a plurality of parallel and spaced-apart spikes 26 arranged in a single row longitudinally of the slat. Lower portions 27 of spikes 26 are snugly secured in holes provided therefor in the horizotnal portion 22 of lower wall 21, and central portions 28 are similarly secured within spike supporting wall 20. Spikes 26 preferably lie in a plane inclined about 45 degrees forwardly and outwardly from the plane of the belt. The spikes are formed of a metal such as hard steel.

Slats 15 and flexible sheet 13 are attached to belts 10 by fastening means in the form of a single straight row of rivets 30 extending longitudinally of the slat. The slats thereby serve to connect each of the belts 10 with one another in the space relationship shown. Because the rigid slats are connected to the flexible belts by a single row of fastening means, a certain amount of play (or opening and closing) is experienced between the lower edge portions of the slats and belts 10. As will be understood, this separation between front and rear lower edge portions 23a and 25a is a maximum for any slat when the slat is moving around the end rollers of the conveyor, although this action can occur to a lesser degree between the end rollers. Means are provided for preventing fibers transported by the conveyor belt assembly from becoming trapped between the slats and the belt. Herein these means comprise an elongate rigid member 31 fixed within the void or space between depending leg portions 23 and 25, said member being interposed between resilient sheet 13 and flexible belt 10 so as to hold resilient sheet 13 in continuous contact entirely along the lower edge portions 23a and 25a of each slat. Since sheet 13 is in continuous contact with the entire lower leading and lower trailing edges of the slats, fibers are unable to get between the slats as was the case with prior art structures where the rigid slat was only affixed to the endless belts.

FIGURE 3 shows a slight variation of the conveyor belt assembly, this form being frequently used for conveying fibers aligned transversally of the direction of motion of the conveyor belt assembly. Flexible belts 10' are of the same general configuration as the belts 10 of the earlier described variation, and upper surfaces 11' are similarly covered by a flexible and resilient sheet of fireproof material 13'. Slats 15' are preferably extruded of aluminum, and are oriented and attached to the belts 10' by rivets (not shown) in a manner similar to that of the embodiment shown in FIGURES 1 and 2. Each of the slats 15' has a generally D-shaped cross section including a lower generally horizontal wall 35, a pair of spaced-apart and upright sidewalls 36, and an upper convex wall 37. Although somewhat simpler in form, this variation of conveyor belt assembly still enjoys some of the advantages already pointed out in favor of the earlier described embodiment.

I claim:

1. In a conveyor belt assembly for conveying fibrous material in a textile mill, said assembly including a flexible endless belt and a plurality of transversely oriented solid slats connected thereto, each slat having leading inner edge portions and trailing inner edge portions, the improvement comprising: a continuous flexible sheet of fireproof material covering said belt and connected thereto for movement therewith; said slats being formed of a hollow, extruded metal section; and means for maintaining continuous contact between said material and one of said edges to thereby prevent said fibrous material from becoming trapped between the slats and the belt during conveyance thereof.

2. The improvement as defined in claim 1, wherein said means comprises a thin rigid member generally underlying each slat and interposed between said sheet of material and said belt.

3. The improvement as defined in claim 2, wherein each of said slats and its underlying rigid member are attached to said belt by means of a row of rivets extending longitudinally of the slat and perpendicular to the direction of motion of said belt.

4. The improvement as defined in claim 1, wherein said slats are made of aluminum.

5. The improvement as defined in claim 4, wherein each slat includes a concave leading wall, and a downwardly and rearwardly sloping rear wall, said slats having a plurality of spikes extending outwardly at about a 45° angle from the plane of the belt.

6. A conveyor belt assembly for transporting fibers in a textile mill, comprising: a pair of spaced elongate endless belts having outer surfaces; a resilient sheet of fireproof material covering the outer surfaces of said belt and extending therebetween; a plurality of parallel and elongate slats carried by said belts, each slat extending laterally between said belts and having front and rear spaced-apart leg portions forming a void therebetween, said leg portions extending toward said belts and having lower edges in contact with said sheet of material; an elongate rigid member carried between the spaced-apart depending leg portions of each slat and interposed between said sheet of material and said belts; and fastening means connecting each of said slats with said belts along a line perpendicular to the belts.

7. The conveyor belt assembly as defined in claim 6, wherein said slats are extruded of aluminum.

8. The conveyor belt assembly as defined in claim 6, wherein each of said slats are hollow and formed of an extruded metal, said slats having an outer plane face generally parallel to the belt, a forward plane face sloping toward said belt from said outer face, a concave leading wall between said forward face and the forward leg portion, and a rearward face angling inwardly from said outer face, and including a plurality of spikes extending outwardly from said forward face.

References Cited by the Examiner

UNITED STATES PATENTS

| | | | |
|---|---|---|---|
| 336,126 | 2/1886 | Ludlum | 198—197 |
| 1,718,150 | 6/1929 | Hurxthal et al. | 198—197 X |
| 2,540,266 | 2/1951 | Johnson | 198—199 |

EVON C. BLUNK, *Primary Examiner.*

A. C. HODGSON, *Assistant Examiner.*